US005257207A

United States Patent [19]

Warren

[11] Patent Number: 5,257,207

[45] Date of Patent: Oct. 26, 1993

[54] METHOD FOR MONITORING GASKET COMPRESSION DURING FASTENER TENSIONING

[76] Inventor: Richard P. Warren, 673 Oakridge Dr., San Luis Obispo, Calif. 93405

[21] Appl. No.: 659,417

[22] PCT Filed: Jul. 14, 1989

[86] PCT No.: PCT/US89/03109

§ 371 Date: Mar. 12, 1991

§ 102(e) Date: Mar. 12, 1991

[51] Int. Cl.[5] .............................................. G05D 17/02

[52] U.S. Cl. .................................. 364/508; 73/862.23

[58] Field of Search ............................... 364/508, 551; 73/862.23, 760, 761, 796, 797, 627

[56] References Cited

U.S. PATENT DOCUMENTS

| | | | |
|---|---|---|---|
| 3,759,090 | 9/1973 | McFaul et al. | 73/627 |
| 4,106,176 | 8/1978 | Rice et al. | 364/508 |
| 4,333,220 | 6/1982 | Aspers | 364/508 |
| 4,333,351 | 6/1982 | Bickford | 73/766 |
| 4,375,120 | 3/1983 | Sigmund | 364/508 |
| 4,375,121 | 3/1983 | Sigmund | 364/508 |
| 4,375,123 | 3/1983 | Ney | 73/764 |
| 4,400,785 | 8/1983 | Wallace et al. | 364/508 |
| 4,450,727 | 5/1984 | Reinholm et al. | 364/508 |
| 4,685,050 | 8/1987 | Polzer et al. | 364/508 |
| 4,738,145 | 4/1988 | Vincent et al. | 364/508 |
| 4,768,388 | 9/1988 | Fader et al. | 364/508 |
| 4,811,238 | 3/1989 | Gerrath et al. | 364/508 |
| 4,969,105 | 11/1990 | Gaenssle | 364/508 |

*Primary Examiner*—Jack B. Harvey
*Assistant Examiner*—Ellis B. Ramirez
*Attorney, Agent, or Firm*—Daniel C. McKown

[57] ABSTRACT

A method for tensioning large bolts (16) used in securing covers (12) for openings in pressure vessels, pipe couplings, valves and the like, in which a sealing gasket (18) is used. The method is designed to prevent leakage in gasketed connections by monitoring the interaction of bolt tension and gasket compression. The method is particularly concerned with determining the bolt tension at which full gasket compression is achieved. This allows the user to verify proper gasket density, proper gasket seating, and proper bolt preload. The method involves measuring changes in a dimension (E) related to gasket compression as bolt tension (F) is increased. Full gasket compression to a metal compression stop is noted as a sharp change in the ratio ΔE/ΔF. A secondary method of identifying the point of full gasket compression utilizing acoustic transmission is described. The secondary method may be used to verify the results of the first method.

6 Claims, 11 Drawing Sheets

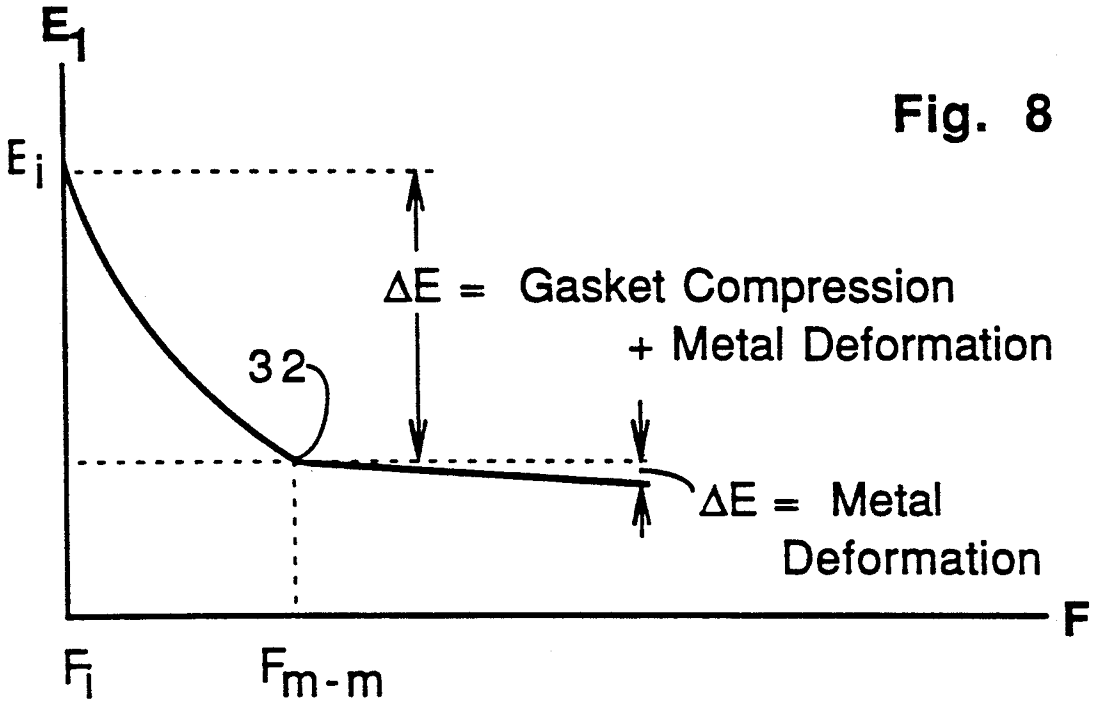
Fig. 8
Fig.9
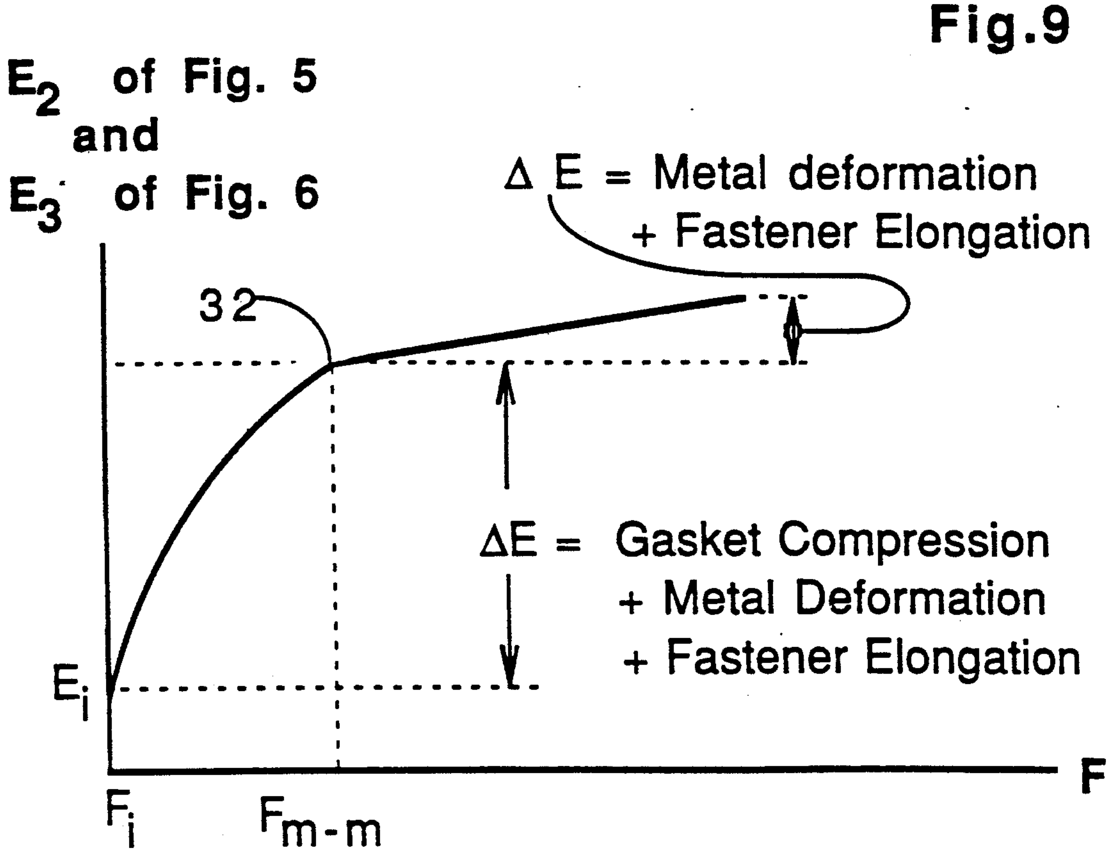

METHOD FOR MONITORING GASKET COMPRESSION DURING FASTENER TENSIONING

DESCRIPTION

1. Technical Field

The present invention is in the field of mechanical engineering and more specifically relates to a method for monitoring gasket compression during bolt tensioning in pressurized fluid systems to prevent leakage of a fluid. Typical applications of the present invention would be on piping systems used in nuclear power generating plants or in other applications with high internal pressures and where consequences of leakage are severe.

2. Background Art

Piping systems, pressure vessels, pumps, and valves that contain high pressure and/or aggressive liquids or gasses are normally closed by flanged and bolted connections and are sealed by special gaskets. Traditionally, the bolts used in such devices have been tensioned by use of a torque wrench, but alternative methods are in use.

In one alternative method of tensioning the bolts, a special device called a hydraulic tensioner is used. One type of hydraulic tensioner employs hydraulic pressure to pull on the end portion of the bolt, and with the bolt thus stretched, the nut, which is unloaded, is tightened. Bolt tensioners are described in the following U.S. Pat. Nos. 3,749,362; 4,249,718; 4,438,901; and 4,433,828.

Although, in many cases, bolt tensioners are easier, more convenient, and more accurate to use than a torque wrench, such tensioners merely apply force, and still include no apparatus or method for monitoring the compression of the gasket.

In U.S. Pat. No. 3,643,501, Pauley describes a differentiator that turns off a power wrench when the tension applied to a fastener begins to exceed the elastic limit of the fastener. This range of tension is far greater than that with which the present invention is concerned, and Pauley's invention is based on a different physical effect than the present invention.

In U.S. Pat. No. 4,102,182, Brown, et al, describe a tensioning procedure in which limits on the slope of the torque versus angle curve are employed.

In U.S. Pat. No. 4,400,785, Wallace, et al, use a microprocessor to measure successive areas under the torque versus angle curve to determine whether a tightening criterion has been met.

In U.S. Pat. No. 4,228,576, Eshghy uses a torque or tension versus angle curve to monitor or control tightening of fasteners.

None of the above patents provides a tensioning method that considers the unique needs of pressure-sealing gaskets. In contrast, the present invention is concerned only with situations in which a gasket is to be compressed to a specific desired extent, and identifying the bolt tension at which that specific gasket compression takes place.

DISCLOSURE OF INVENTION

The present invention is intended for use with a bolt tensioner on flanged and bolted connections of the type in which gasket compression is limited by a metal compression stop. The compression stop may either be part of the gasket or part of the flange. The invention permits the user to determine the bolt tension at which proper gasket compression takes place, which allows the user to verify that the gasket was of proper density and that the proper bolt preload was added.

Since high pressure sealing gaskets can be of different densities yet indistinguishable in size, shape, and color, a connection cannot be confirmed as being properly tensioned without verifying proper gasket behavior. If the gasket is too soft, the gasket will compress fully to the compression stop with too little bolt tension, and may leak regardless of how much additional bolt tension is added. If the gasket is too dense, full gasket compression may not occur at maximum bolt tension, leaving the full bolt tension on the gasket surface. In this latter condition, future gasket relaxation reduces bolt tension and may result in a leak. This condition also allows the bolts to be subjected to increased fatigue loading. To avoid leakage, full gasket compression (to the compression stop) must occur at proper bolt tension, with additional bolt tension added to withstand variable internal and external loads. This leaves the gasket properly loaded, and, with the compressing flanges rigidly connected metal-to-metal and adequately preloaded, joint movement and bolt fatigue loading are minimized.

Consequently, the major object of this invention is to monitor the compression of the gasket as bolt tension is increased, and to detect the tension at which full gasket compression, and therefore metal-to-metal contact, is achieved.

Unlike prior art, the present invention directly measures the displacement produced by a specific amount of applied tension, and reveals the point of metal-to-metal flange contact by a sharp change in rate of displacement for a given increase in applied tension.

In some cases, when further verification of metal-to-metal contact is desired, acoustic transmission (from one flange to the other) may be monitored, with the changes in transmission associated with metal-to-metal contact serving to confirm the previous indication.

The behavior of "bolts" and nuts is identical to "studs" and nuts for the purposes of this invention. The appropriate choice sometimes is dictated by the component geometry. In further discussion, the terms "bolt" and "stud" will be used interchangeably, with the understanding that one term may apply to the other as the application dictates. The term "threaded fastener" includes both "studs" and "bolts."

Sealing of connecting parts in high pressure connections is typically performed with use of "spiral wound gaskets" of the type manufactured by Flexitallic Gasket Company, Inc., of Bellmawr, N.J.. The present invention is particularly well suited to industrial applications using spiral wound gaskets.

In a preferred embodiment of the present invention, the user obtains a visual indication of the bolt tension at which proper gasket compression takes place and compares the information to established values to determine the acceptability of the connection. In an alternative embodiment, connection acceptability based on gasket behavior is determined and final fastener tension is achieved without intervention of the user.

In accordance with a preferred embodiment of the present invention, the separation of the surfaces between which the gasket is compressed is measured as the applied tension is increased. When the gasket is being compressed, the separation decreases by a predictable amount for each increment of applied tension. However, after the gasket has been compressed to the desired extent, metal-to-metal contact between portions of the opposing compressing surfaces occurs, and thereafter, further increases in tension result primarily in bolt deformation, with little effect on the separation of the opposing surfaces. Knowledge of the fastener tension at which this metal-to-metal contact occurs along with the final fastener tension is required to properly assess the acceptability of the connection.

In the most general form of the invention, any accurate means of measuring changes in the separation ($\Delta E$) of the compressing surfaces and changes in fastener tension ($\Delta F$) may be used to identify the transition from the ratio $\Delta E/\Delta F$ measured during gasket compression to the distinctly different ratio $\Delta E/\Delta F$ measured after full gasket compression and resulting only from elastic deformation of the metal connecting parts. This permits measurements of separation to be made at convenient locations on the device being tensioned or on the tensioning device itself, thereby facilitating use of the method of the present invention. It also permits the use of any of several known tensioning devices, which further enhances the usefulness of the method of the present invention.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 8 is a graph showing displacement as a function of applied bolt tension as would be measured with the apparatus of FIG. 1;

FIG. 9 is a graph showing displacement as a function of applied bolt tension as it would be measured with the apparatus of FIG. 5 and with the apparatus of FIG. 6;

BEST MODE FOR CARRYING OUT THE INVENTION

Figure 1:
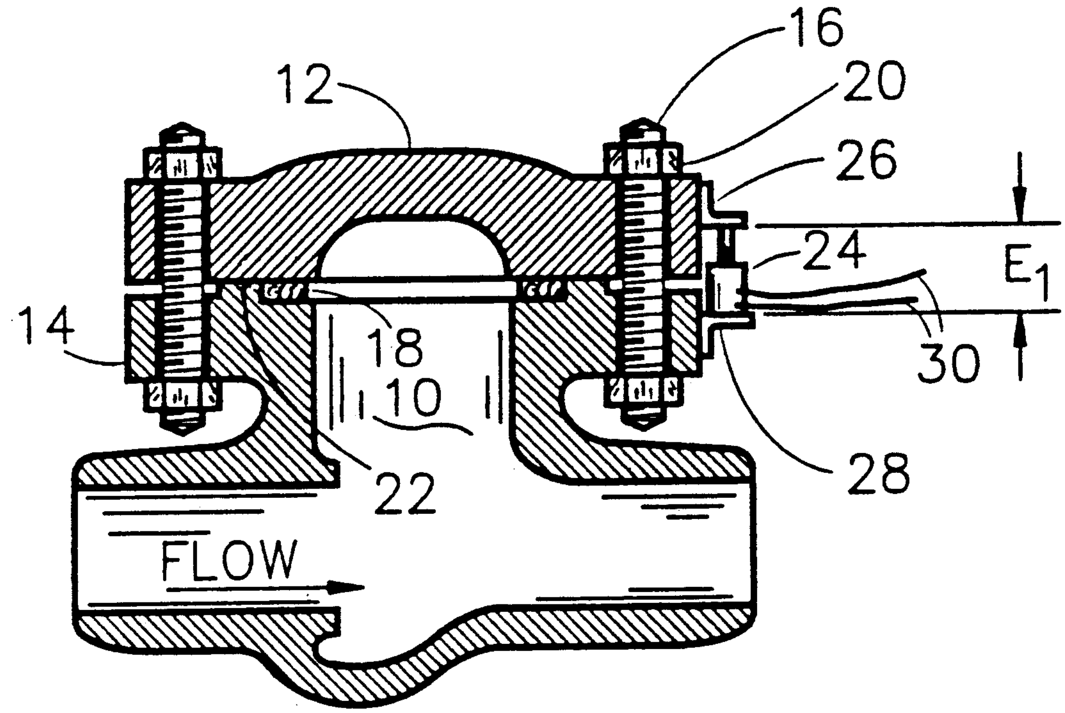
FIG. 1 is a side elevation view partially in cross section showing a valve of the type of construction with which the method of the present invention may be used, and showing a means of measuring changes in the separation of the compressing surfaces.

FIG. 1 shows a check valve (flapper not shown) of the type on which the method of the present invention could be used. The diameter of the flow path will vary from several centimeters to a meter or more, and the valve may weigh up to several thousand Kg. Access to the interior of the valve for maintenance is provided by the lateral duct 10 which is closed by the bonnet 12. The bonnet 12 is secured to the body 14 of the valve by studs of which the stud 16 is typical.

A gasket 18 is compressed between the bonnet 12 and the body 14 to form a seal. Compression of the gasket 18 is intentionally limited by the annular land 22. The bonnet is thus shown in its sealing position.

During assembly, the gasket 18 is laid in place and the bonnet 12 is rested on it. Initially, the gasket 18 is only slightly compressed by the weight of the bonnet, and the annular land 22 is not in contact with the bonnet 12. Thereafter, the fasteners, of which the stud 16 is typical, are tensioned, drawing the bonnet ever closer to the body 14. The gasket 18 is gradually compressed until the land 22 makes contact with the bonnet 12. This point at which the land contacts the bonnet is the point at which proper gasket sealing has taken place; it is usually referred to as the point at which "metal-to-metal contact" is reached between the land and the bonnet. Further tensioning will do nothing to enhance the sealing of the gasket, but may be required to provide adequate preload to withstand internal and external forces.

As shown in FIG. 1, and in accordance with a preferred embodiment of the present invention, a linear variable differential transformer (LVDT) 24 is mounted on a bracket 28 that is attached to the body 14. The LVDT 24 includes a probe that makes contact with the bracket 26 that is mounted on the bonnet 12. In this way, the LVDT produces an electrical signal on the lead wires 30 that is related to the separation between the bonnet and the body.

FIG. 8 is a graph showing the relation between the applied stud tension F and the separation $E_1$ between the bonnet 12 and the body 14 of the check valve of FIG. 1. Upon assembly, initial values of stud tension F and separation $E_1$ are shown as $F_i$ and $E_i$ respectively.

During the first phase of fastener tensioning, changes in $E_1$ represent primarily gasket compression plus some metal deformation, and the separation $E_1$ decreases rapidly with increasing tension. However, at some point 32 of FIG. 8, the land 22 of FIG. 1 makes contact with the bonnet 12. The stud tension at point 32 is shown as $F_{m-m}$, and represents the tension at which "metal-to-metal" contact is developed. During tensioning after metal-to-metal contact has been obtained, changes in $E_1$ are slight, and represent metal deformation only.

Figure 2:
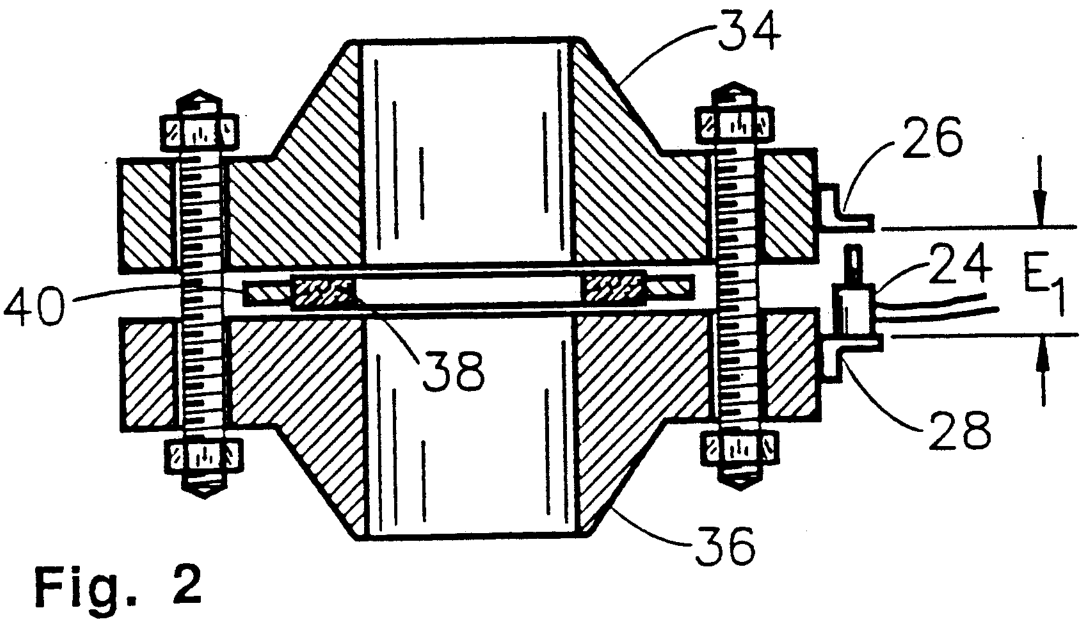
FIG. 2 is a side elevational view in cross section showing a pipe coupling of the type with which the method of the present invention may be used, and showing a means of measuring changes in the separation of the compressing surfaces.

FIG. 2 shows another situation in which the present invention can be used. FIG. 2 shows a coupling for joining two lengths of pipe. The halves 34 and 36 are drawn together by an arrangement of nuts and bolts comparable to that shown in FIG. 1.

It should be noted that the coupling of FIG. 2 lacks a feature comparable to the annular land 22 of FIG. 1. To limit the compression of gasket 38, a thinner ring 40 of metal is provided around the circumference of the gasket 38. The ring 40, sometimes called a compression gauge or compression stop, effectively prevents overcompression of the gasket 38. The compression stop 40 is commonly supplied as part of the gasket.

Figure 3:
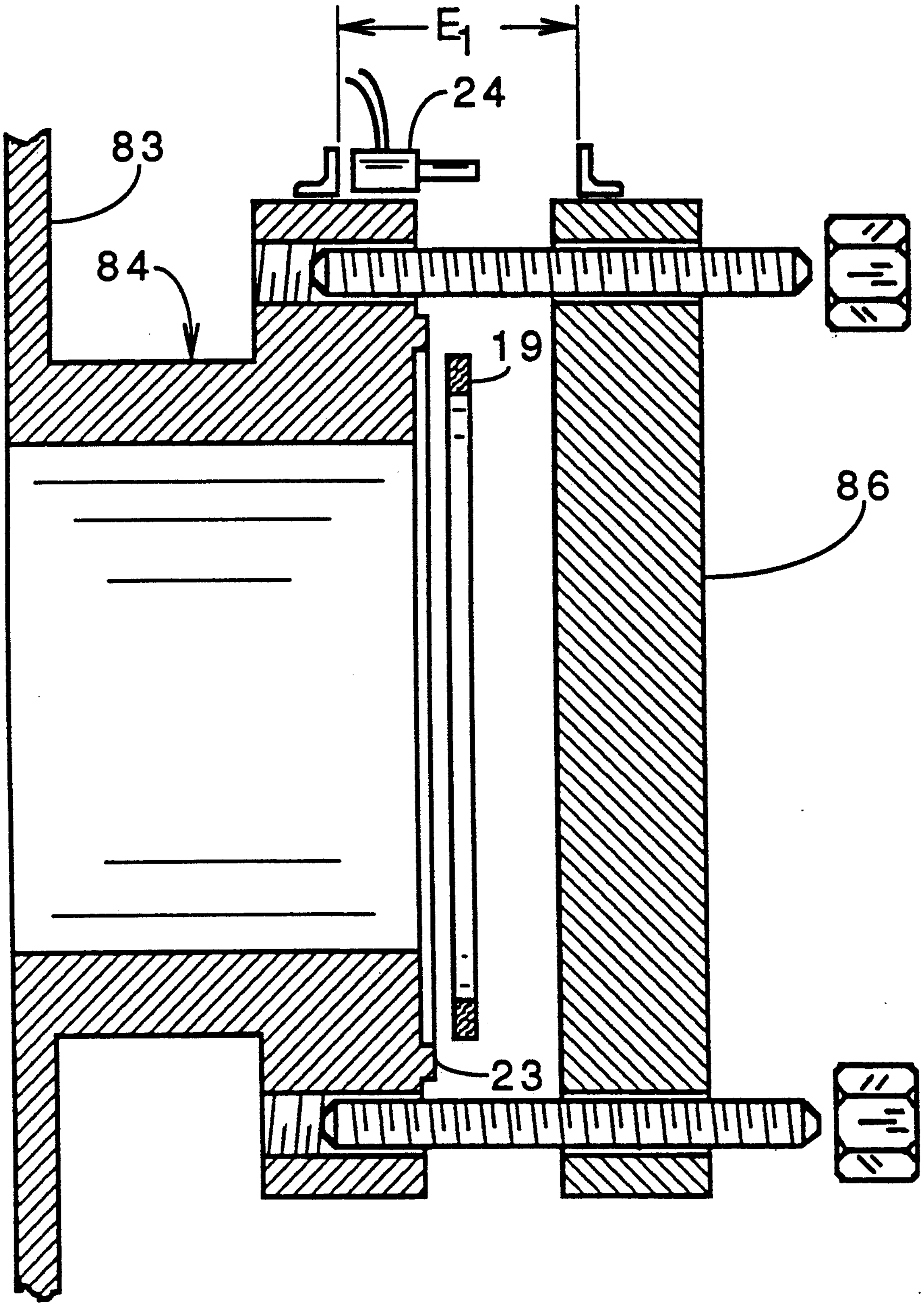
FIG. 3 is a side elevational view partially in cross section of a pressure vessel with a manway and cover of the type with which the present invention may be used.

FIG. 3 shows another situation in which the present invention can be used. FIG. 3 shows a section of a pressure vessel wall 83, a manway 84 and a circular manway cover 86. The manway 84 and the manway cover 86 are drawn together by a number of nuts and studs situated around the perimeter of the cover, thereby compressing the gasket 19 as the studs are tensioned. As in FIG. 1, the gasket compression is limited to the proper amount by an annular land 23. Also similar to FIG. 1, FIG. 3 is shown with an LVDT 24 that produces an electrical signal that measures changes to the value $E_1$ which is related to the separation of the manway 84 and the manway cover 86.

Figure 4:
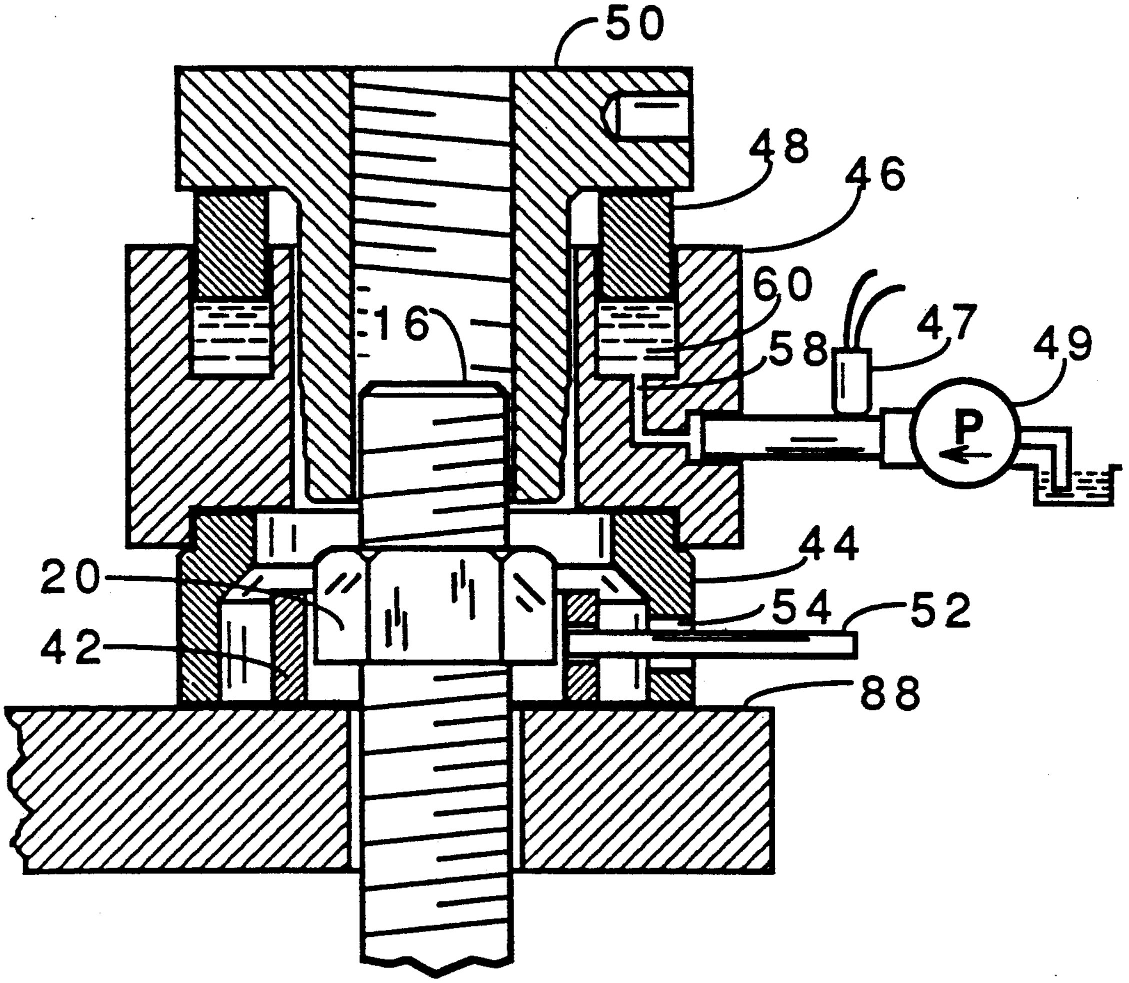
Fig. 4 (Prior Art)
FIG. 4 is a side elevational view partially in cross section showing a typical hydraulic bolt tensioner in use.

One convenient apparatus for using the method of this invention is a hydraulic tensioner. One type of hydraulic tensioner is shown in FIG. 4, in which hydraulic force is used to compress the gasket and stretch the stud, allowing the nut to easily be run down to hold tension, after which the hydraulic force is removed.

In the typical sample shown, a socket 42 fits over the nut 20 and is used to tighten the nut after the stud 16 has been stretched. The base 44 fits over and surrounds the socket 42. The base 44 serves to position the other elements of the hydraulic tensioner. The base 44 includes an aperture 54 through which a tommy bar 52 may be inserted to rotate the socket, and with it the nut. Other methods have been used to rotate the nut.

The hydraulic chamber housing 46 of the hydraulic tensioner sits on the base 44 and includes a hydraulic chamber 60 in the form of a circular groove. A ram 48 fits slidably within the hydraulic chamber 60, and sealingly engages it. The puller 50 is internally threaded for engaging the threads of the stud 16, and when the puller has been screwed onto the stud 16, it secures the ram, the hydraulic chamber housing, and the base in the position shown.

Tensioning is accomplished by energizing a hydraulic pump 49. The hydraulic pressure is transmitted through the duct 58 to the hydraulic fluid within the hydraulic chamber 60. The hydraulic pressure forces the ram 48 against the puller 50, thereby stretching the stud 16. While the stud is in this stretched condition, the socket 42 is rotated to tighten the nut 20 against the flange surface 88.

It is not necessary to apply any great torque to the nut 20, and in practice it may be rotated manually until the nut makes firm contact with the flange surface 88.

When the stud is being tensioned, the hydraulic pressure operates over the constant area of the ram 48, and therefore, the force F applied to the stud 16 is a function of the hydraulic pressure. Consequently, an electronic pressure sensor 47 is used to determine the force F applied to each stud. In some manual applications, a standard pressure gauge is used instead of an electronic pressure sensor.

Figure 5:
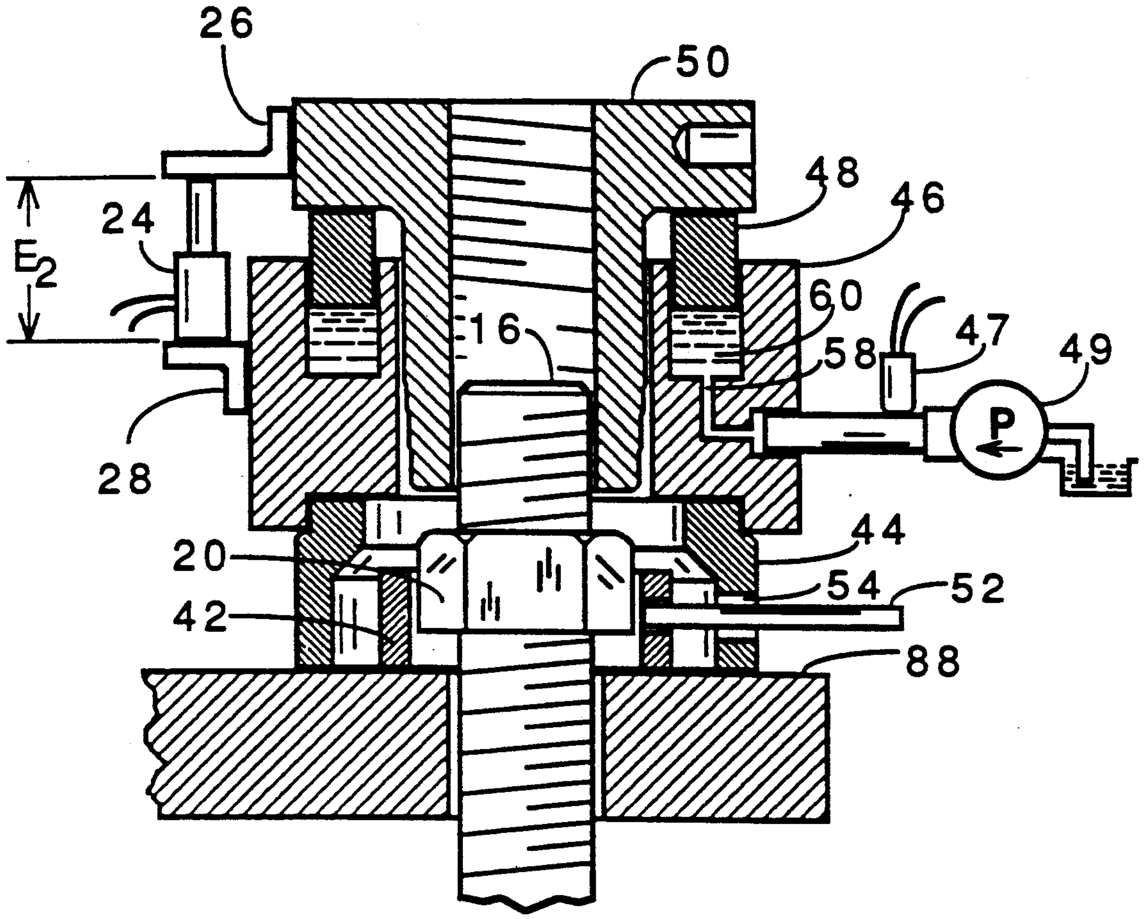
FIG. 5 is a side elevational view partially in cross section showing a typical hydraulic bolt tensioner in use with a means of measuring displacement of compressing surfaces as a function of travel between parts of the tensioner.

In accordance with another embodiment of the present invention, as shown in FIG. 5, an LVDT 24 is mounted between brackets 26 and 28, and measures $E_2$, the movement between the stationary hydraulic chamber housing 46 and the puller 50. Clearly, as the puller increases tension to the stud 16, the dimension $E_2$ also increases.

Figure 6:
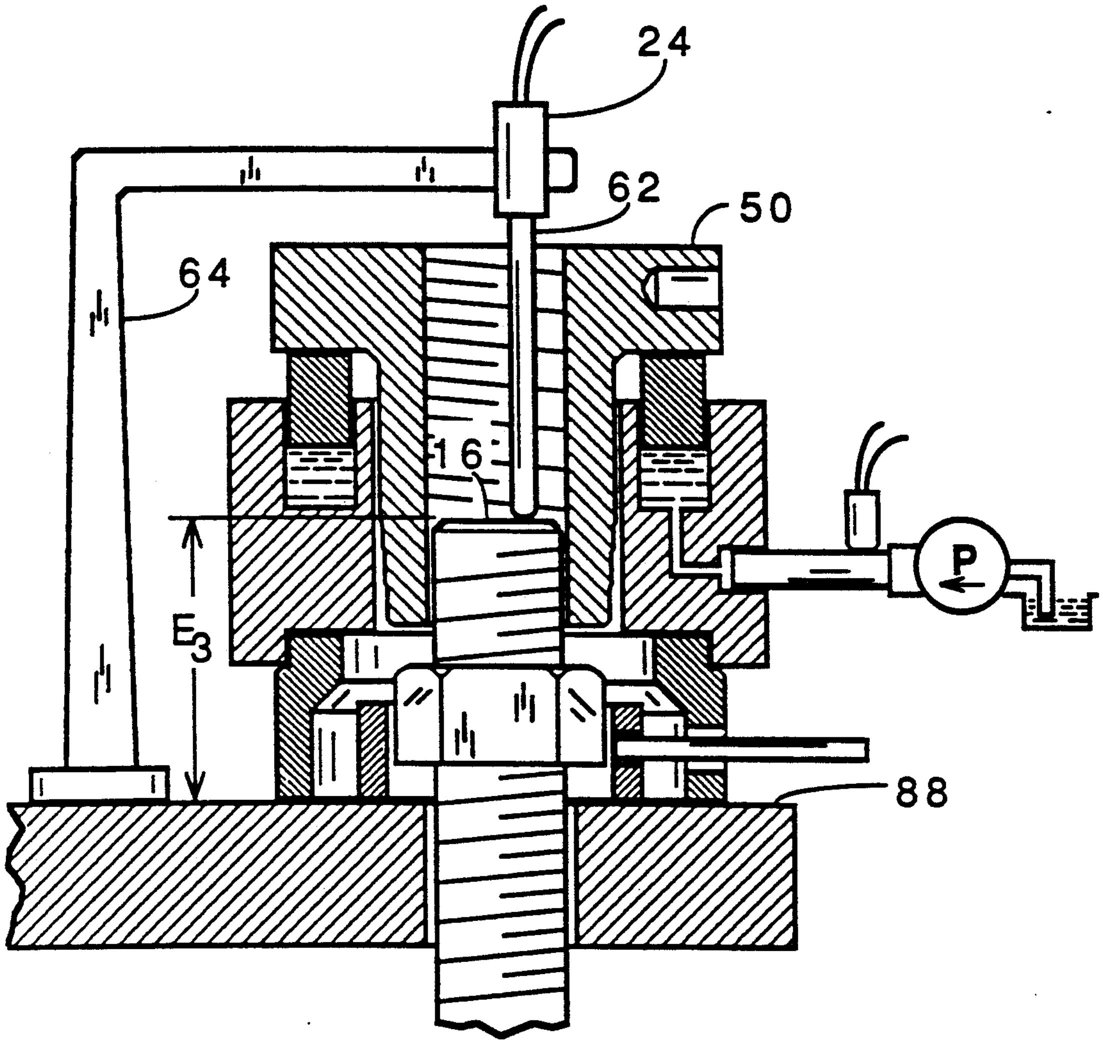
FIG. 6 is a side elevational view partially in cross section showing a typical hydraulic bolt tensioner in use with a means of measuring displacement of compressing surfaces as a function of travel between the end of the threaded fastener and the outside of one of the compressing members.

In accordance with another embodiment of the present invention, as shown in FIG. 6, an LVDT 24 is mounted on the bracket 64, and the probe portion 62 of the LVDT extends to contact the end of the stud 16. The LVDT measures changes in $E_3$, the distance between the top 88 of the flange surface and the stud 16. As the puller 50 increases tension to the stud 16, the dimension $E_3$ also increases.

FIG. 9 shows the dimensions $E_2$ and $E_3$ as a function of the applied tension F. Changes in $E_2$ and $E_3$ represent the cumulative effects of gasket compression, metal deformation, and fastener elongation. The dimensions $E_2$ and $E_3$ increase relatively rapidly as the gasket is being compressed, but when metal-to-metal contact is reached at point 32, the rate of increase slows abruptly, and is limited to the deformation of various metal parts including stud elongation. The degree of the changes in $E_2$ and $E_3$ as plotted in FIG. 9 differ from the degree of the changes in $E_1$ plotted in FIG. 8 in that stud elongation is not a factor in the arrangements plotted by FIG. 8.

The point 32 is the minimum tension required to fully seal the gasket, since further tension does not appreciably compress the gasket, but merely applies additional preload to the connection. Once point 32 has been reached, adequate preload may then be added to withstand variable internal and external loads as required to minimize joint movement and fatigue loading on the bolts.

Figure 10:
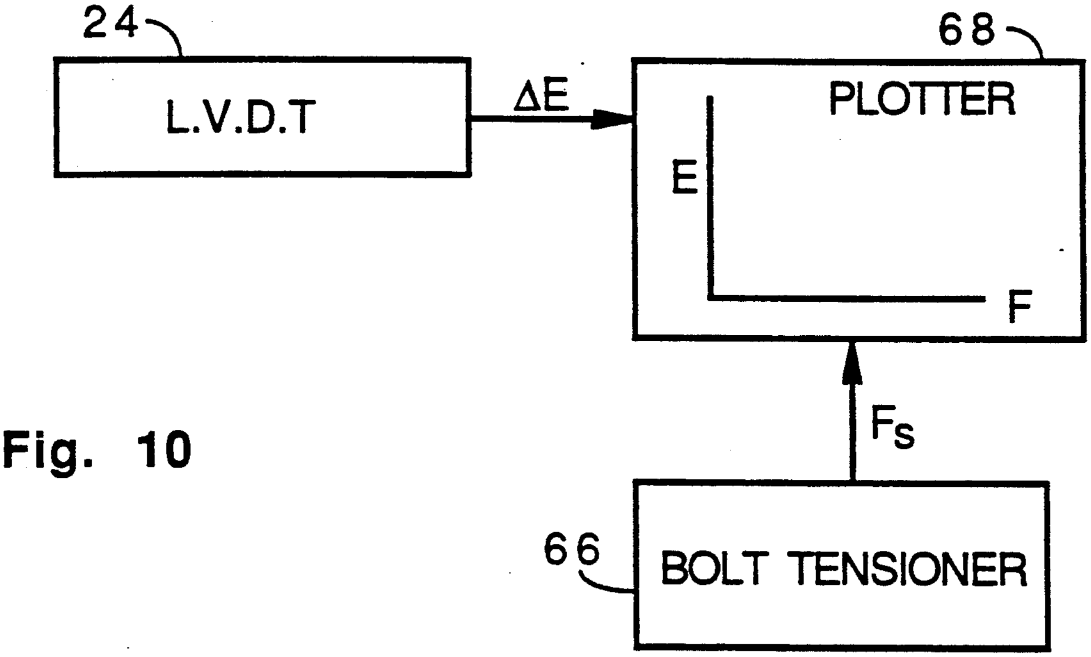
FIG. 10 is a block diagram showing a preferred embodiment of an apparatus implementing the method of the present invention.

In accordance with a preferred embodiment of the invention, the point 32 of FIGS. 8 and 9 can easily be recognized using the arrangement shown in FIG. 10. Through use of an LVDT, an electrical signal is produced which represents the changes in one of the variables $E_1$, $E_2$ or $E_3$, denoted for simplicity by E. Another electrical signal, $F_s$, representing the bolt tension, is produced by the bolt tensioner 66. The signal $F_s$ may be derived from a pressure sensor of a hydraulic bolt tensioner. These signals are applied to the vertical and horizontal axes, respectively, of the plotter 68 to produce graphs such as those shown in FIGS. 8 and 9.

In accordance with the embodiment of the invention shown in FIG. 10, the tension is increased as the user watches the plotter 68. The user observes the slope of the curve produced. For smaller values of F, the observed slope should correspond to the slope calculated on the theory that gasket is being compressed with limited metal deformation. The user is especially alert for changes in the slope. A sharp change in slope, shown as point 32 of FIGS. 8 and 9, indicates that metal-to-metal contact has been reached. Further tensioning results primarily in metal deformation and fastener elongation, and serves to preload the connection. Once the predetermined desired preload has been added, the user inhibits further increases in tension by the bolt tensioner, and tightens the nuts until they firmly contact the surface against which they bear. Thereafter, the user commands the bolt tensioner to relieve the hydraulic force altogether and removes the bolt tensioner from the bolt in question, leaving the nut to hold the connection at the desired tension.

In some situations, it may be desirable to have secondary verification of the bolt tension at full gasket compression. A method using acoustic transmission is used for this verification.

Figure 7:
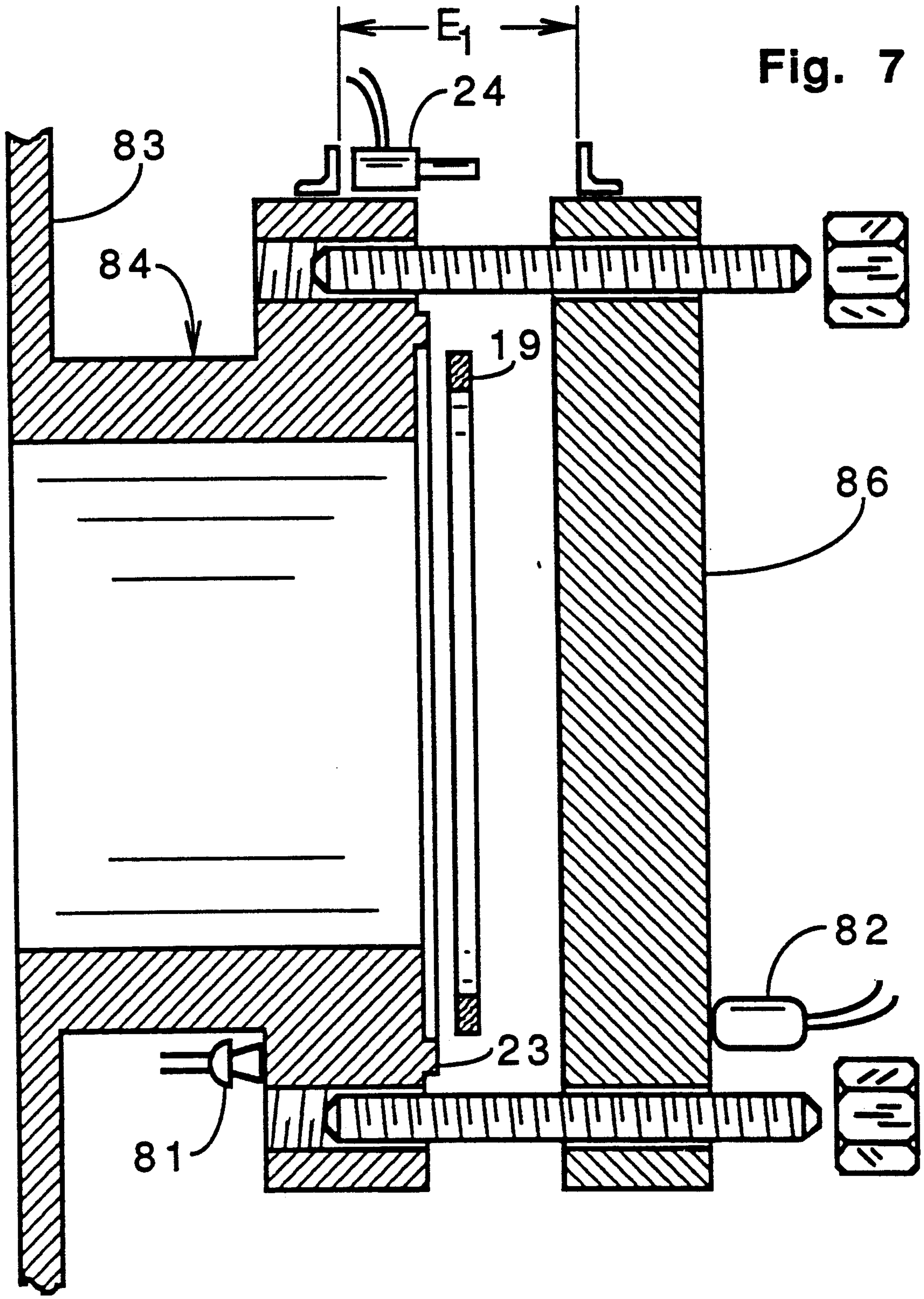
FIG. 7 is a side elevation view partially in cross section showing a manway of the type with which the method of the present invention can be used including a secondary verification device.

In accordance with the embodiment shown in FIG. 7, an acoustic transmitter 81 is placed on one flange and an acoustic pick-up 82 placed on the other. The acoustic devices are placed at maximum spacing from the fasteners and such that a direct acoustic path through the compression stop will be developed when the gasket is fully compressed and the flanges are tensioned metal-to-metal.

Figure 11:
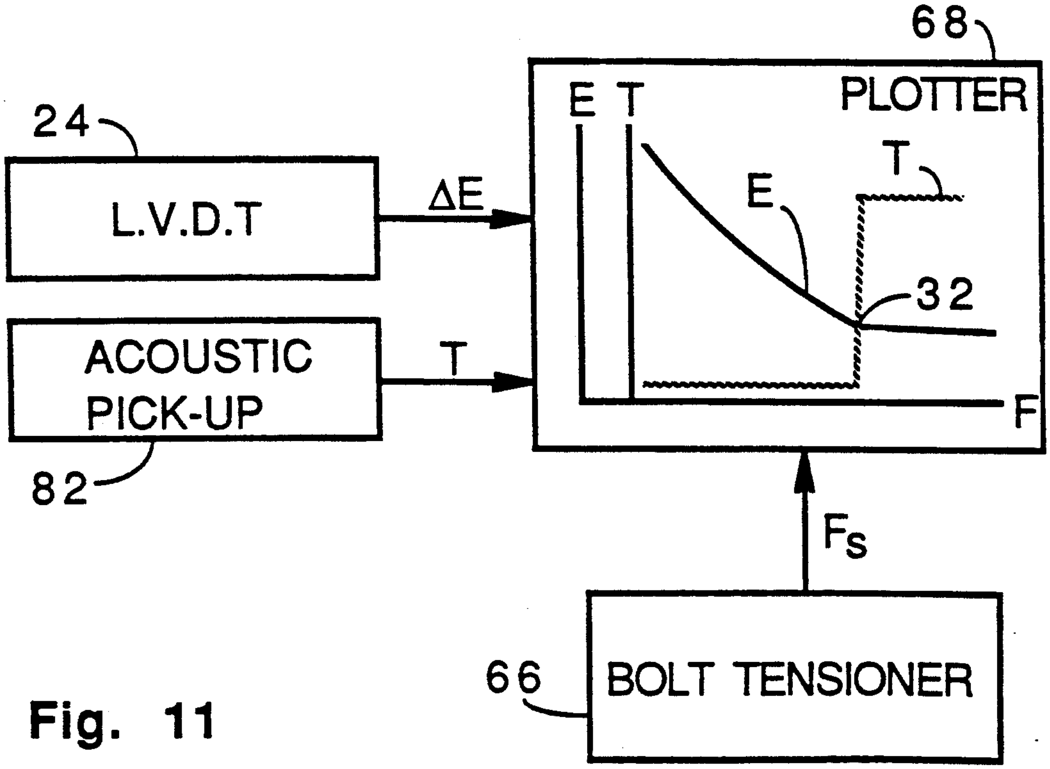
FIG. 11 is a block diagram showing another way of implementing the method of the present invention including secondary verification.

In accordance with the embodiment shown in FIG. 11, acoustic transmission T from one flange to the other is plotted, along with E, as a function of bolt tension. The signal component corresponding to the acoustic pathway through the fasteners is filtered out. The remaining acoustic transmission is highly resistant to crossing gasket material or an air gap, and a sharp increase in transmission from one flange to the other flange occurs as the gasket is fully compressed and metal-to-metal contact is developed. This sharp increase in acoustic transmission serves to confirm that point 32 has been reached. Acoustic "through transmission" equipment of the type manufactured by Erdman Industries Incorporated of Pasadena, Calif., may be used for this application.

The use of acoustic transmission as a means of determining full gasket compression is primarily considered a method of verifying the results of the method using measurements of E, since measurements of E provide a more complete picture of the interaction of the joint components.

Figure 12:
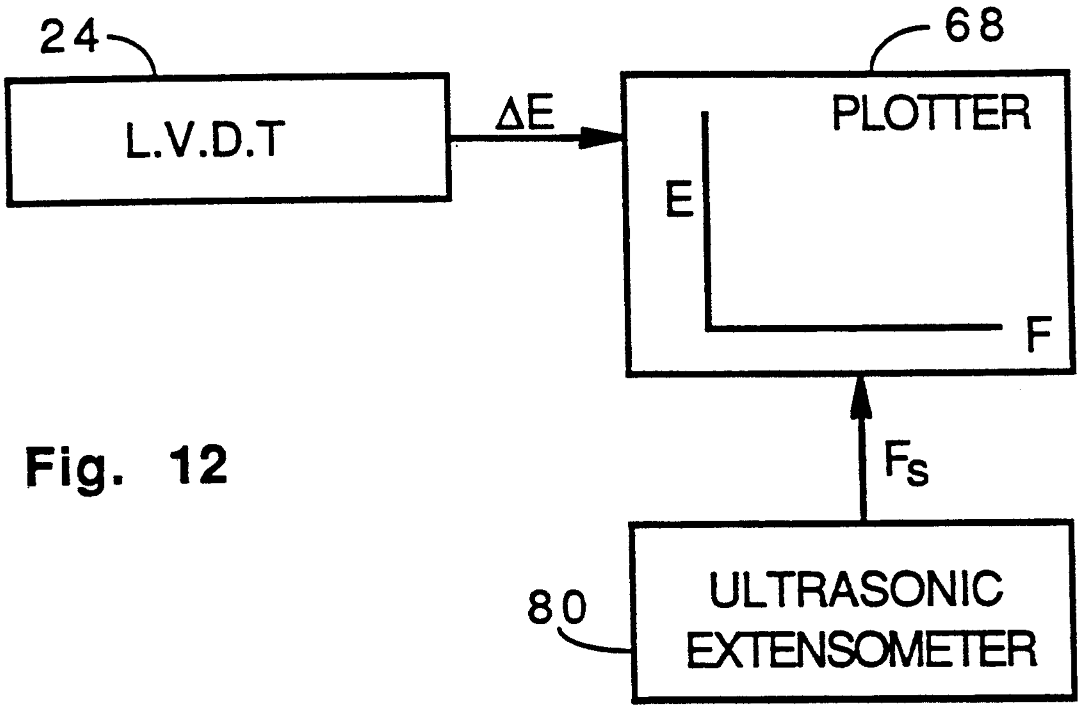
FIG. 12 is a block diagram showing another way of implementing the method of the present invention.

FIG. 12 shows a variation of the embodiment shown in FIG. 10, in that the electric signal $F_S$ related to bolt tension is obtained from an ultrasonic extensometer 80 rather than the bolt tensioner. Such a device is manufactured by Raymond Engineering of Middletown, Conn.

Figure 13:
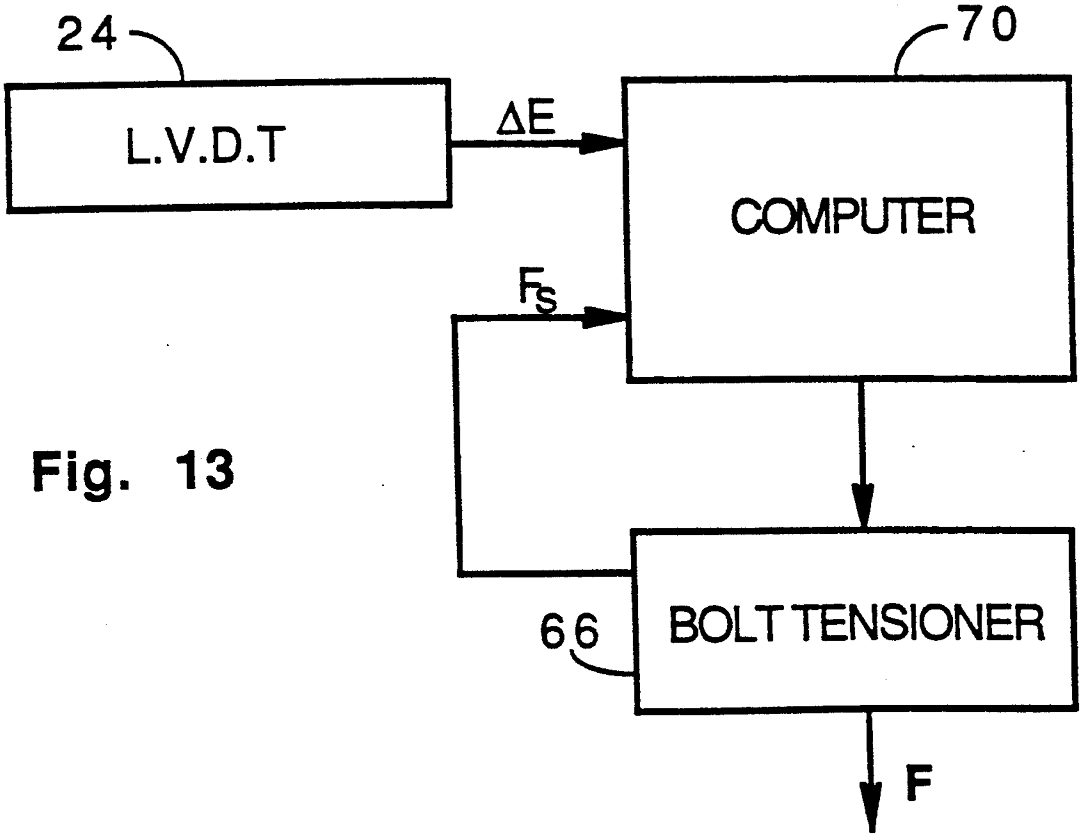
FIG. 13 is a block diagram showing another embodiment of an apparatus implementing the method of the present invention.
Figure 15:
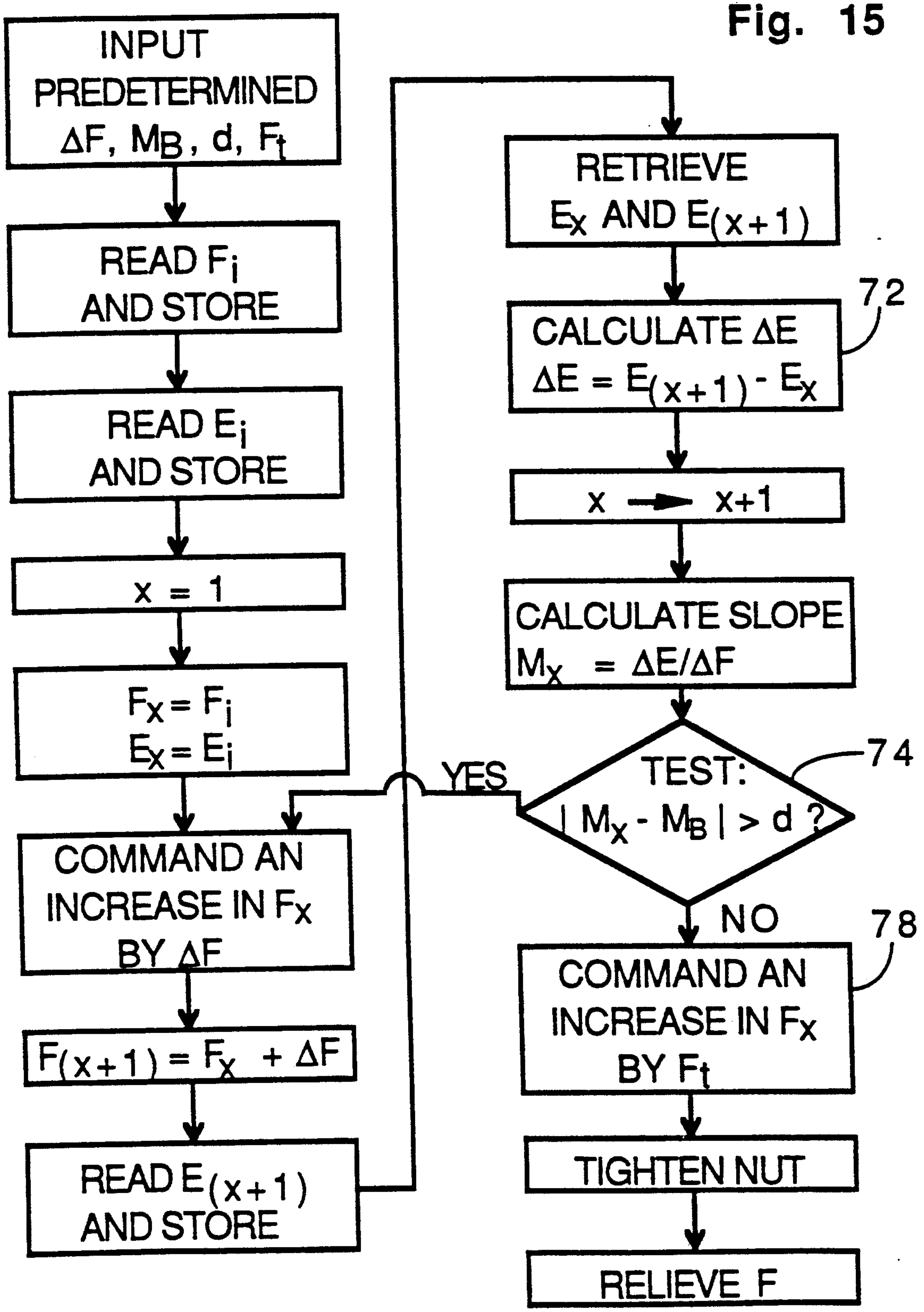

FIGS. 13 and 15 show another embodiment of the present invention in which the bolt tensioner 66 is operated under control of a computer 70. In that embodiment, the tension applied by the bolt tensioner is increased, and at uniform predetermined intervals ($\Delta F$) tension increase, the dimension E is read by the LVDT 24, and is sent to the computer 70 in the form of an electrical signal.

As shown in FIG. 15, this sensed value of E is stored in the computer, and tension is further increased. After the further increase by $\Delta F$ has been accomplished, the next reading of E is read by the LVDT and is stored in the computer. The successive values of E are subtracted in the computer as indicated by the step 72 of FIG. 15. This calculated increment $\Delta E$ is then divided by $\Delta F$ to calculate the corresponding slope $M_x$ of the curve. This incremental slope $M_x$ is compared to a predetermined stored value $M_B$ and the magnitude of the difference is then compared to a predetermined value d. The values "$M_B$" and "d" are described below.

The value of $M_B$ is the slope of the portion of the curve that occurs after the gasket has been fully compressed and the flanges have contacted metal-to-metal. The slope $M_B$ is the result of deformation of the metal parts, and its expected value may be calculated. Alternatively, $M_B$ may be empirically determined by preassembling the connection without a gasket, or $M_B$ may be taken from previous or similar assemblies. The expected value of $M_B$ is initially stored in the computer.

The preselected threshold level d provides a tolerance for the predetermined $M_B$ such that the value of $M_B$ may be approximated, yet still easily identify the sharp change in slope noted as point 32 of FIGS. 8 or 9. The test step 74 of FIG. 15 compares the value $\Delta E/\Delta F$ with $M_B$ after each increase in fastener tension, and is the computer's method of determining if the bolt tensioner is operating to the left of the point 32 of FIG. 8 or 9. In the event the tensioner is operating to the left of the point 32, the computer commands the tensioner to increase the bolt tension by $\Delta F$, and the check is repeated. In the event that the computer determines that the bolt tensioner is operating to the right of the point 32 in FIG. 8 or 9, the program branches to the step 78 in which the computer commands the bolt tensioner to increase the tension by the amount of the predetermined desired preload, $F_t$. Thereafter, the nut is tightened and the tensioner force is relieved.

Figure 14:
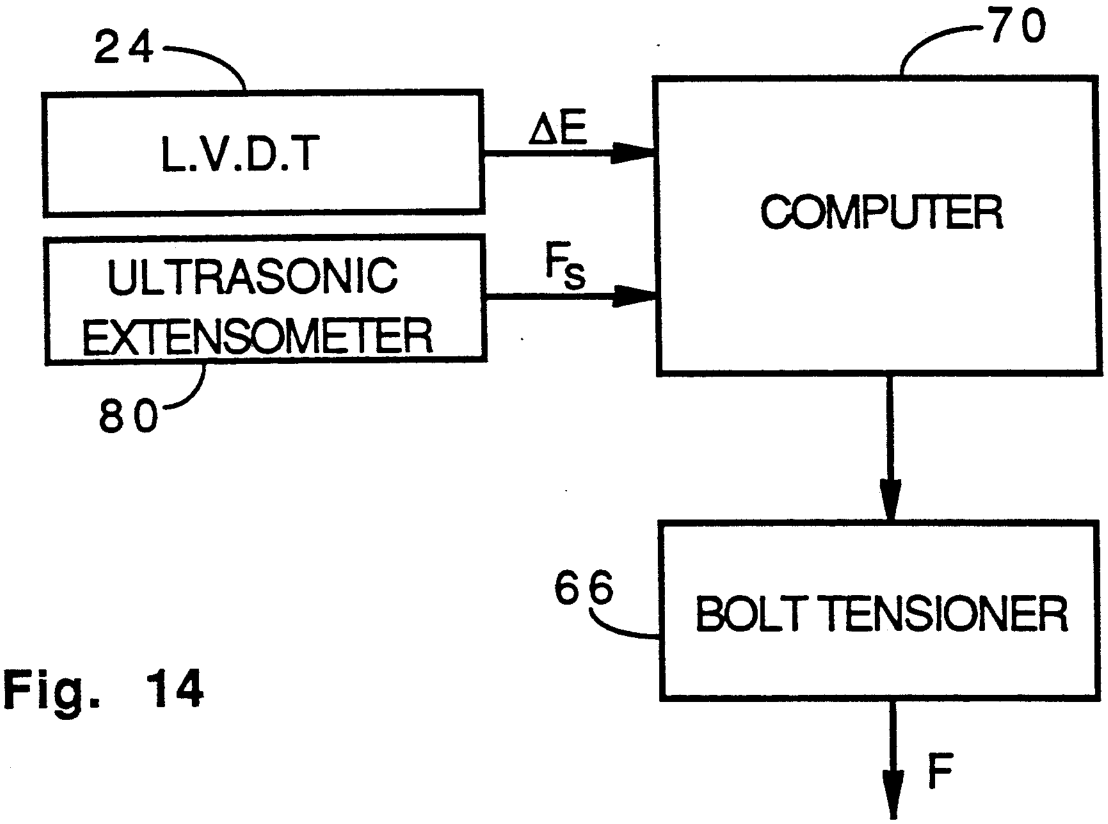
FIG. 14 is a block diagram showing a variation of the embodiment of FIG. 11; and, FIG. 15 is a flow chart showing the algorithm used in the embodiment of FIGS. 13 and 14.

Although FIG. 13 shows the use of the bolt tensioner to provide the signal $F_S$, in a variation of that embodiment shown in FIG. 14, the ultrasonic extensometer 80 is used to provide $F_S$.

Normally, the bonnet 12 of FIG. 1, the coupling half 34 of FIG. 2, and the manway cover 86 of FIG. 3 are secured by a number of studs. In carrying out the procedure of the present invention, it is possible to provide hydraulic tensioners of the type shown in FIG. 4 for use on some or all the studs simultaneously from a common pressurized hydraulic supply.

Thus, there has been described a method for use with a bolt tensioner to monitor the compression of a sealing gasket in order to identify the tension at which proper full gasket compression has been obtained. A method of secondary verification of full gasket compression is also presented. Further tensioning beyond this point may be required to preload the connection, which restricts joint movement and reduces fatigue loading of the bolts.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

INDUSTRIAL APPLICABILITY

The method of the present invention is an improved way of making closures on pressurized fluid systems. The method allows the user to monitor the closure for proper gasket behavior and therefore for proper bolt preload. The method should find application in those industries that use pressurized liquids or gases where the consequences of a leak are very undesirable. Such installations include nuclear power plants, aerospace bases, refineries, chemical plants, and hydroelectric power plants.

I claim:

1. A method for determining the tension of a threaded fastener at which a specific limited amount of gasket compression takes place, the threaded fastener extending from a first member and passing through a clearance hole in a second member, a nut retaining the second member on the threaded fastener with an end portion of the threaded fastener extending beyond the nut, a gasket having a sealing portion included between opposing surfaces of the first and second members with the sealing portion being progressively compressed as the first and second members are drawn together but having compression mechanically limited to a desired amount, the method comprising the steps of:

a) imposing a known force F between the second member and the end portion of the threaded fastener, the force F being in such direction as to draw together the first and second members;
b) measuring a dimension signal E that is a function of the separation of the first and second members, such that changes in signal E indicate gasket compression and metal deformation;
c) increasing the known force F by a known increment ΔF;
d) measuring again the dimension signal E;
e) determining the change ΔE in the dimension signal E resulting from the increase in step c) of the known force F; and,
f) comparing the change ΔE with the change that would be expected if the first and second members had reached their mechanical limit of gasket compression.

2. The method of claim 1 wherein an end portion of the threaded fastener extends beyond the nut and wherein a hydraulic tensioner is attached to the end portion of the threaded fastener and wherein the step of imposing a known force further comprises the steps of pressurizing the hydraulic tensioner and of measuring the hydraulic pressure in the hydraulic tensioner.

3. The method of claim 1 wherein the step of applying a known force further comprises the step of rotating the nut.

4. The method of claim 2 wherein the step of imposing a known force on the gasket further comprises the step of measuring the elongation of the threaded fastener.

5. The method of claim 1 further comprising the additional and subsequent step of verifying through a secondary means that the first and second members had reached their mechanical limit of gasket compression.

6. The method of claim 5 wherein an acoustical transmitter is attached to the first member for transmitting an acoustical signal, and an acoustical receiver is attached to the second member for receiving the transmitted acoustical signal, and wherein the step of verifying further comprises the step of monitoring the received acoustical signal for an abrupt change in its intensity which occurs when the first and second members reach their mechanical limit of gasket compression.

* * * * *